United States Patent [19]

Harper

[11] 3,846,905

[45] Nov. 12, 1974

[54] ASSEMBLY METHOD FOR SEMICONDUCTOR CHIPS

[75] Inventor: James G. Harper, Dallas, Tex.

[73] Assignee: Texas Instruments Incorporated, Dallas, Tex.

[22] Filed: July 9, 1973

[21] Appl. No.: 377,844

[52] U.S. Cl. .................... 29/589, 29/471.1, 29/498

[51] Int. Cl. .................... H01l 7/00

[58] Field of Search .......... 29/589, 590, 591, 576 S, 29/628, 471.1, 498; 228/4, 5, 6; 174/DIG. 3; 219/85

[56] References Cited

UNITED STATES PATENTS

| | | | |
|---|---|---|---|
| 3,617,682 | 11/1971 | Hall | 29/471.1 |
| 3,689,991 | 9/1972 | Aird | 29/589 |
| 3,696,229 | 10/1972 | Angelucci et al. | 219/85 |
| 3,696,985 | 10/1972 | Herring et al. | 29/589 |
| 3,698,620 | 10/1972 | Geyer et al. | 228/6 |
| 3,722,072 | 3/1973 | Beyerlein | 29/589 |
| 3,791,018 | 2/1974 | Johnston et al. | 29/498 X |

*Primary Examiner*—Roy Lake
*Assistant Examiner*—Craig R. Feinberg
*Attorney, Agent, or Firm*—Harold Levine; James T. Comfort; James O. Dixon

[57] ABSTRACT

A method is described in the assembly of integrated circuits that utilizes laser scribing while protecting the integrated circuit components and which enables use of automated machine-oriented bonding techniques. The method includes aligning a slice of semiconductor material so that the integrated circuits thereon are oriented in a desired manner, the surface of the integrated circuits being covered with a protective wax and secured to a support. Infrared radiation is utilized to align the slice and to illuminate the scribe lines so they are detectable from the back surface of the slice. The slice is then separated along the scribe lines by partially cutting the slice from the back surface of the slice with a laser, the front surface of the slice being protected from the slag produced by the cutting action of the laser. Contacts on the respective chips are then bonded to metal leads by a method which enables utilization of a constant temperature source.

2 Claims, 9 Drawing Figures

ASSEMBLY METHOD FOR SEMICONDUCTOR CHIPS

The present invention pertains generally to an improved method in the assembly of integrated circuits, and more particularly to improved methods for aligning a slice of semiconductor material in a preselected position utilizing infrared radiation, separating the slice into a plurality of chips by cutting with a laser from the back of the slice while protecting the surface of the slice from slag, and subsequently bonding respective chips to metal leads utilizing a constant temperature source of heat.

In the semiconductor industry a variety of techniques have been used to form integrated circuits. Typically, hundreds of identical integrated circuits are formed at spaced locations on one surface of a slice of semiconductor material. The slice is typically on the order of from 2 to 3 inches in diameter. After the integrated circuits are formed, the slice is cut to separate the individual integrated circuits. Each such integrated circuit is commonly referred to in the art as a chip or wafer. Generally, scribe lines are formed between the chips and the slice is cut along the scribe lines, such as with a scribe, saw or laser. A major problem experienced in this area is that the slag produced by the cutting operation often damages components of the integrated circuits. Further, aligning the slice so that the scribe lines are in alignment with the saw blade is generally a time consuming operation. Generally, an operator views the slice through a microscope and physically moves the slice until the scribe lines are in the desired location. Obviously any technique which would automatically align the slice to a selected position would facilitate the assembly procedure.

Once the slice is diced into the respective chips, another problem is experienced in the bonding operation. One typical bonding technique utilizes a strip of a high temperature plastic having a series of apertures or windows therein. Typically, the plastic strip is a polyimide plastic. A typical plastic strip is sold by Dupont Corporation under the trade name of Kapton. A number of separate metal leads are formed on one surface of the plastic strip. The leads are formed so that they extend over an edge of an aperture in the strip. The leads on the plastic strip are disposed such that they are in alignment with bump contacts on the semiconductor chip to which they are to be bonded.

In a conventional bonding operation, the semiconductor chip is placed on a support with the contact bumps being exposed. The plastic strip is positioned over the chip with the lead side up such that the chip is centered in an aperture, the leads being in alignment with the corresponding contacts on the semiconductor chip. A probe is then extended downward through the aperture in the plastic strip. The probe deflects the portion of the leads extending over the edge of the aperture in the plastic strip into contact with the corresponding bumps, or contacts, on the semiconductor chip. The probe is then pulse heated to a temperature sufficient to alloy the metal lead on the plastic strip with the contact on the semiconductor chip. The probe is then cooled while maintaining the metal lead in contact with the semiconductor chip. After sufficient cooling so that the bond solidifies, the probe is withdrawn and a new aperture is indexed over a different semiconductor chip. The temperature pulsing or cycling of the probe has proven to be a major source of problems with this type of bonding technique.

Accordingly, it is an object of the present invention to provide an improved method in the assembly of integrated circuits wherein the semiconductor slice is automatically aligned to a preselected index position to facilitate cutting the semiconductor slice into respective chips.

A further object of the invention is the provision of a method in the assembly of integrated circuits wherein a semiconductor slice can be separated into respective chips by cutting the slice from the back side with a laser while protecting the surface of the integrated circuits by a wax layer.

Yet another object of the present invention is the provision of a method for bonding contacts on a semiconductor chip to metal leads wherein a constant temperature source can be utilized.

Briefly in accordance with one aspect of the present invention, a method is provided for aligning a substrate to a preselected index position. In this method an infrared transmissive substrate, such as a silicon slice, is utilized. A preselected pattern of infrared sensitive material is formed on a first surface of the substrate. The substrate is placed such that the first surface and pattern thereon are in contact with an infrared transparent support. The substrate is secured to the support with an infrared transparent bonding material, such as wax. A beam of infrared radiation is directed onto the exposed surface of the support. The beam is transmitted through the support, wax, and substrate, being blocked only in those areas where the pattern of infrared sensitive material was formed. Thus, the pattern can be discerned on the back surface of the substrate. A mask is then positioned adjacent to the back surface. The mask is formed to have a pattern therein corresponding to the preselected pattern formed on the first surface of the substrate. The relative position of the mask and the support is adjusted such that the pattern and the mask correspond. In this manner the substrate can be located at a preselected index position. In other words, it is possible to identify locations on the back side of the substrate corresponding to preselected locations on the first side of the substrate. Further, this alignment method is readily adaptable to automatic machine-oriented techniques.

In accordance with a different aspect of the invention, an improved method for separating a substrate into a plurality of portions is provided. This method is particularly advantageous in that one surface of the substrate is protected from slag that is produced by the cutting operation. The method includes forming a layer of an adhesive wax on the surface of the substrate that is to be protected from slag. The wax is selected to have properties such that the adhesiveness can be subsequently removed, such as by heating. The exposed surface of the layer of wax is then secured to a suitable support. The substrate is then cut from the exposed side along preselected scribe lines. The scribe lines can be made visible in accordance with the preferred embodiment of the invention by defining infrared sensitive scribe lines on the first surface of the substrate prior to forming the layer of wax thereon and then shining infrared radiation through the support and substrate such that the scribe lines are visible on the back side of the substrate. Once the scribe lines are partially cut through the slice, the slice is removed from the substrate, broken into separate chips and the adhesive properties of the wax is released, such as by heating the wax, thereby enabling the removal of the respective separated portions of the substrate.

In yet a different aspect of the invention an improved method for bonding a metal lead to a contact on the surface of a substrate is provided. In this aspect of the invention, a metal lead is formed on one surface of a plastic strip, which has an aperture in it. The metal lead is formed so that it extends over an edge of the aperture. The plastic strip is positioned such that the metal lead is adjacent a support, which is maintained at a constant elevated temperature sufficient for bonding. In the next step, a chip having a contact is aligned over the aperture in the plastic strip, such that the contact directly overlies the lead. The substrate is then inserted through the aperture, such that the contact deflects the lead into thermal contact with the heated support thereby alloying the lead to the contact. In the next step, the substrate is withdrawn through the aperture. An important advantage of this technique is that the tension of the deflected lead maintains contact between the lead and the chip as the semiconductor body is withdrawn through the aperture. This permits the contact to solidify. It can be seen that this obviates the necessity of using a source of heat that is pulsed, or cycled, as is conventionally done.

Other objects and advantages of the present invention will be apparent upon reading the following detailed description of illustrative embodiments in conjunction with the drawings wherein.

Figure 4:
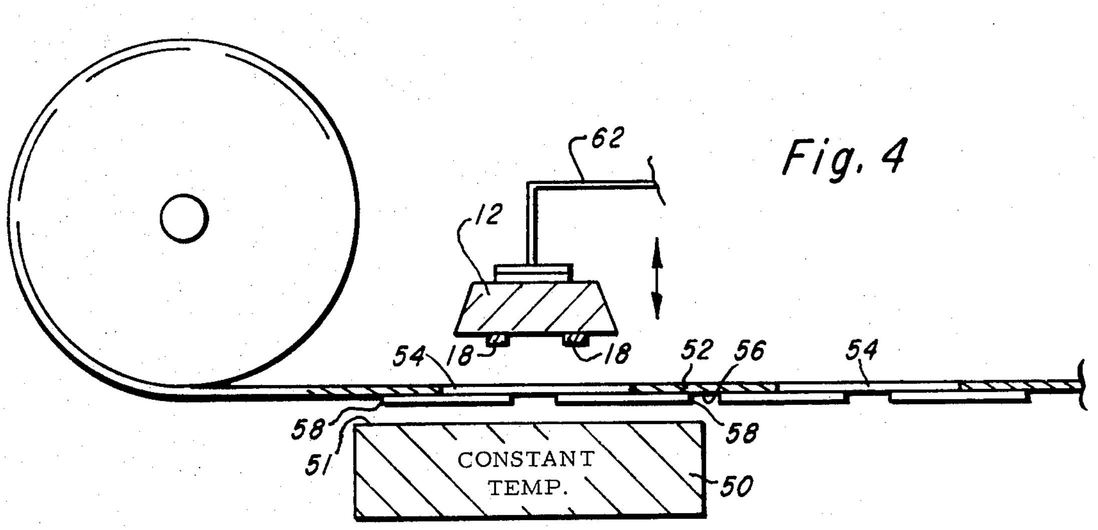
Figure 5:
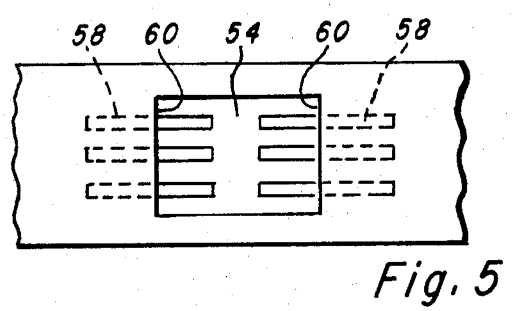
Figure 6:
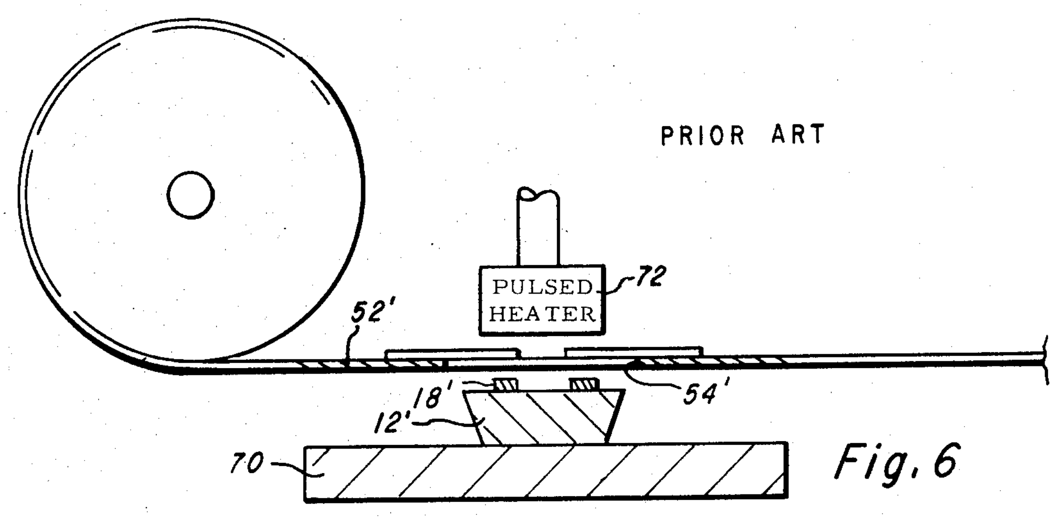

FIGS. 3*a*–3*d* are cross-sectional views illustrating the method in accordance with the present invention of aligning a slice of semiconductor material to a preselected index position and cutting through the slice from the back side with a laser beam;

FIG. 4 illustrates a cross-sectional view of the bonding method utilized in accordance with the present invention;

FIG. 5 is a plan view of a portion of a plastic strip which can be utilized in the bonding procedure shown in FIG. 4; and FIG. 6 is a cross-sectional view showing conventional bonding techniques.

Figure 1:
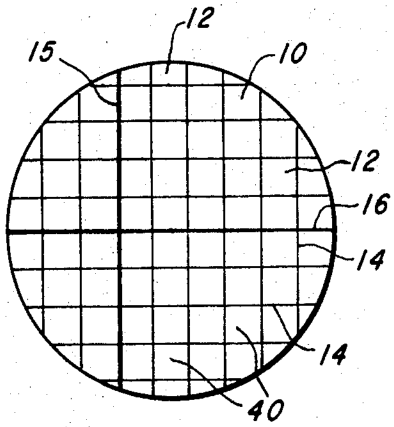
FIG. 1 is a plan view of a semiconductor slice diagrammatically showing scribe lines on the surface thereof.

With reference now to the drawings, and particularly with reference to FIG. 1, a substrate 10 that is to be cut into a plurality of individual portions is shown in plan view. In a preferred embodiment the substrate 10 comprises a slice of semiconductor material, such as silicon. The slice has formed thereon a plurality of integrated circuits shown generally by reference numeral 12. Techniques for forming such integrated circuits in a semiconductor slice are well-known in the art and will not be described in detail herein.

The surface of the slice of semiconductor material 10 is divided into a matrix of semiconductor wafers by scribe lines 14. Techniques for forming such scribe lines are also well-known in the art and typically are lines which are formed during circuit fabrication and which separate each integrated circuit, i.e., chip, from the adjacent semiconductor chips. As illustrated in FIG. 1, two of the scribe lines 15 and 16 are identifiably different from other scribe lines. For example, these scribes lines may be wider than other scribe lines. These two scribe lines are disposed orthogonally to one another and may subsequently be utilized in aligning the slice to a predetermined position. That is, the scribe lines 15 and 16 form an alignment reticle.

Figure 2:
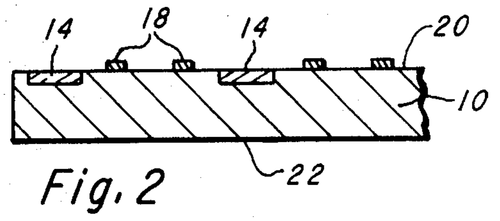
FIG. 2 is a cross-sectional view of a portion of the slice shown in FIG. 1.

With reference now to FIG. 2, a cross-sectional view of a portion of the slice shown in FIG. 1 is illustrated. Contacts 18 are illustrated on the surface 20 of the slice. These contacts 18 typically may be gold or solder bumps. Techniques for forming such contacts are well-known in the art and therefore need not be discussed in detail herein.

In accordance with one aspect of the invention, a method is provided for separating the slice shown in FIG. 1 into the respective wafers 12 by cutting the slice along scribe lines 14. Inasmuch as cutting the slice with a laser beam offers many advantages in processing, the method is particularly advantageous for laser cutting. As explained previously, a major problem encountered with laser scribing of semiconductor slices is that the laser beam produces slag which often damages the surface 20 (FIG. 2) of the semiconductor slice. Thus, a technique for protecting the surface 20 of the semiconductor slice is required. Further, it is advantangeous to cut through the slice of material from the back side, i.e., side 22 (FIG. 2). To accomplish this, however, it is necessary to somehow identify the position of the scribe lines on the side 22 of the slice. Also, the slice must be aligned into a selected index position in order for the laser to automatically step through the sequence of cutting each scribe lines.

With reference to FIGS. 3*a*–3*d*, the method for protecting surface 20 of the semiconductor slice, aligning the slice in a preselected index position, and cutting through or partially cutting the slice from the back side with a laser beam is illustrated.

Figure 3A:
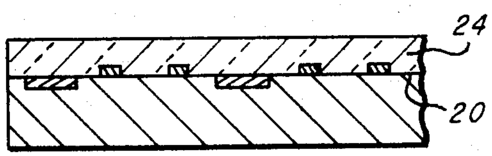

With reference to FIG. 3*a*, the surface 20 of the slice is covered with a layer 24 of a suitable material such as a wax. Various materials may be used for the layer 24, such as polystyrene, beeswax, etc. The properties of the layer 24 are that it must be infrared transmissive; it must be sufficiently adhesive to hold the slice in a stable position; and the adhesiveness must be releasable, such as upon the application of heat.

Figure 3B:
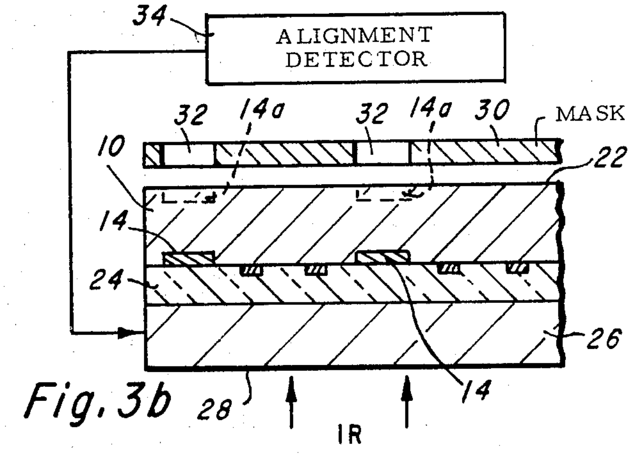

With reference to FIG. 3*b* the structure shown in FIG. 3*a* is inverted and is secured to a support 26. To facilitate alignment, the support 26 is movable to the XY directions and is also rotatable. The support 26 is also infrared transmissive and may, by way of illustration, be a suitable glass. Infrared radiation is directed upon the surface 28 of the support 26. The infrared radiation passes through the infrared transmissive support 26, the infrared transmissive wax 24, and the infrared transmissive substrate 10. The radiation however, does not pass through the metal scribe lines 14 and thus there is an indication on the surface 22 of the substrate 10 at locations 14*a* which identifies location of he scribe lines. The surface 22 is viewed through a mask 30, which has apertures 32 which correspond with locations on the substrate for effecting alignment. In a preferred embodiment, the apertures 32 correspond with scribe lines 15 and 16 (FIG. 1), thereby facilitating alignment of the slice with a preselected index position determined by the position of the mask 30. This indexing alignment can be effected automatically by utilizing an infrared detector system 34 which is coupled to the movable support 26. Systems suitable for automatically effecting this alignment are known in the art and need not be described in detail herein.

Figure 3D:
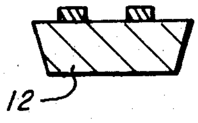
Figure 3C:
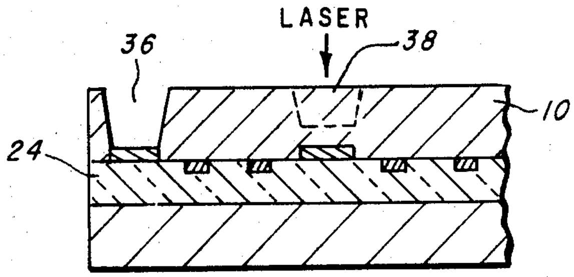

Subsequent to the alignment procedure illustrated in FIG. 3*b*, a laser beam may be utilized to cut through the slice along the scribe lines, such as shown at 36, where the slice has been completely cut through and at 38 where the laser has cut only a portion of the way through the slice 10. Since the slice has been aligned to a preselected index position, the laser can be automatically controlled to cut along the various scribe lines 14, as they are spaced a known distance one from the other. After the slice is completely scribed, the layer 24 of wax is heated sufficiently to enable removal of the respective wafers 12 from the support 26. A typical wafer 12 is shown in FIG. 3*d*. The wafer 12 is now ready for bonding to metal leads.

A further advantage of the present method for aligning the slice utilizing infrared radiation is that infrared sensitive ink spots 40 (FIG. 1) can be placed on defective chips. The system for removing the semiconductor chips after the slice has been completely scribed can include an infrated sensitive detector. This detector can sense the location of the ink spots 40 which identify defective chips and can be programmed to automatically skip over such chips. Such infrared sensitive responsive systems are also known in the art.

With reference now to FIGS. 4 and 5, the improved method in accordance with the present invention for bonding the semiconductor chips to metal leads is illustrated. As will be apparent, this method enables utilization of a constant temperature source 50 for bonding the contacts 18 on the surface of the chip 12 to the metal leads. In accordance with this method, a plastic strip 52 comprises a suitable material such as a plastic selected from the class of polyimide plastics. The plastic strip has apertures 54 extending through it; these apertures are shown most clearly in FIG. 5 which is a plan view of the portion of plastic strip directly under the chip 12 in FIG. 4. One surface 56 of the plastic strip has a plurality of metal fingers 58 which serve as metal leads for subsequent bonding to the solder or gold bumps 18 of the semiconductor chip 12. The metal leads 58 extend along the surface 56 of the plastic strip and extend over the edge 60 of the apertures 54, in essence forming cantilever leads.

In operation, one of the apertures 54 of the plastic strip 52 is positioned over the constant temperature plate 50, the leads 58 being adjacent the source 50. The heat source 50 which preferably has a flat upper surface 51, is maintained at a temperature sufficient to alloy the metal leads, which by way of illustration can be tin plated copper, to the contacts 18. For example, a suitable temperature for the heat source 50 can be on the order of 380°C. A good semiconductor chip 12 is then selected from the scribed slice 10, described with respect to the description of FIGS. 3*a*–3*d*. The wafer 12 is still in a known alignment and therefore can be accurately positioned over the aperture 54 such that the contacts 18 thereon are in alignment with underlying leads 58. A conventional vacuum arm shown generally at 62 can be utilized to remove the chip from the support 26. The vacuum arm 62 then moves in a direction perpendicular to the surface of the strip 52 to extend the chip 12 through the aperture 54 such that the contacts 18 press against the metal leads 58 and deflect them into thermal contact with the constant temperature plate 50. The metal leads 58 and contacts 18 are then heated to a temperature sufficient to cause alloying to occur. The vacuum arm 62 then withdraws the chip 12 back through the aperture 54. The tension of the deflected lead 58 maintains a constant pressure between the contact 18 and the lead 58 during withdrawal, allowing the bond to solidify. Thus, it is not necessary to pulse the plate 50 through a temperature cycle to allow cooling of the bond to occur. This is to be contrasted with the prior art technique shown in FIG. 6.

In FIG. 6, the semiconductor wafer 12' is disposed upon a suitable support 70. The plastic strip 52' is positioned such that an aperture 54' overlies the wafer 12'. In this technique the metal leads 58' are formed on the upper surface of the plastic strip 52'. A pulsed heater 72 is then directed to extend through the aperture 54' deflecting the metal leads 58' into contact with the contacts 18'. The contact and metal leads are heated to alloying temperature. The pulse heater is then allowed to cool so that the bond between the metal lead and the contact can solidify. Once the bond has solidified the pulse heater 72 is withdrawn back through the aperture.

In view of the above description of the illustrative embodiments of the present invention, it will be seen that several noteworthy advantages have been achieved. These advantages include provision of automatically aligning a slice of semiconductor material utilizing infrared radiation. This in turn enables cutting the slice into chips from the back side thereof. During this cutting operation, the semiconductor slice surface is protected from slag produced by laser cutting action by a layer of wax. Utilization of the infrared radiation also enables detection of defective chips automatically when these chips are coated with an infrared sensitive ink spot. The semiconductor chip aligned in a preselected manner can then be moved and bonded to metal leads. Utilization of a constant temperature source for bonding the leads substantially increases through-put and insures a constant bonding temperature for each contact, providing obvious advantages of speed and reliability over the pulsed type heater probe used in conventional bonding techniques.

While the present invention has been described in detail with respect to illustrative embodiments, it will be apparent to those skilled in the art that various changes may be made without departing from the spirit or scope of the invention.

What is claimed is:

1. A method for bonding a metal lead which is formed on one surface of a plastic strip to extend over an edge of an aperture therethrough to a contact on a surface of a semiconductor body comprising the steps of:

a. positioning said lead adjacent a support which is maintained at a constant elevated temperature sufficient for alloying said lead to said contact;
b. aligning said semiconductor body with said aperture in said plastic strip such that said contact directly overlies said metal lead;
c. inserting said body through said aperture such that said contact deflects said lead into thermal contact with said support, thereby heating said lead and said contact to alloy a portion of said lead to said contact; and d. withdrawing said body from said aperture, the tension of said deflected lead maintaining contact between said lead and said contact during the interval required for said alloyed portion to solidify.

2. An automated method for sequentially bonding electrical contacts on semiconductor chips to corresponding sets of metal leads on a continuous plastic strip wherein said plastic strip has a plurality of apertures therein for respectively receiving a semiconductor chip, each aperture having associated therewith a set of metal leads which are formed on one surface of said strip adjacent each aperture, a portion of each lead extending over an edge of the aperture, comprising the steps of:

a. positioning said strip such that a first aperture overlies a support which is maintained at a constant temperature which is sufficient for alloying said electrical contacts to corresponding set of leads, said one surface of said strip disposed adjacent the surface of said support.

b. aligning a first semiconductor chip over said first aperture, the electrical contacts on said chip adjacent and in alignment with a set of corresponding leads;

c. inserting said first chip through first aperture such that said contacts deflect said set of leads into thermal contact with said support, thereby allowing a portion of each lead to its corresponding contact;

d. withdrawing said chip from said aperture, the tension of said deflected leads maintaining contact between said ends and said contacts during the interval required for said alloy portions to solidify;

e. positioning said strip such that a second aperture and its corresponding set of leads overlies said support;

f. aligning a second semiconductor chip over said second aperture and inserting it through said second aperture such that the electrical contacts on said second chip deflect said corresponding set of leads associated with said second aperture into thermal contact with said support to effect alloying a portion of each lead to its associated contact; and g. withdrawing said second chip from said second aperture, the tension of said deflected leads maintaining contact between said leads and said contacts during the interval required for said alloyed portions to solidify.

* * * * *